United States Patent
Pfau et al.

(10) Patent No.: US 8,899,830 B2
(45) Date of Patent: Dec. 2, 2014

(54) HOUSING OF A TEMPERATURE SENSOR, ESPECIALLY OF A THERMAL FLOW MEASURING DEVICE

(75) Inventors: Axel Pfau, Arlesheim (CH); Torsten Iselt, Kempten (DE); Dirk Boguhn, Munich (DE)

(73) Assignee: Endress + Hauser Flowtec AG, Reinach (CH)

( * ) Notice: Subject to any disclaimer, the term of this patent is extended or adjusted under 35 U.S.C. 154(b) by 422 days.

(21) Appl. No.: 13/301,904

(22) Filed: Nov. 22, 2011

(65) Prior Publication Data

US 2012/0125093 A1    May 24, 2012

(30) Foreign Application Priority Data

Nov. 22, 2010 (DE) .......................... 10 2010 061 731

(51) Int. Cl.
*G01K 1/14* (2006.01)
*G01F 15/18* (2006.01)
*G01K 1/08* (2006.01)
*G01F 1/684* (2006.01)

(52) U.S. Cl.
CPC ................ *G01F 1/684* (2013.01); *G01F 15/18* (2013.01); *G01K 1/08* (2013.01)
USPC ............................ 374/208; 73/866.5; 374/163

(58) Field of Classification Search
CPC ......... G01K 13/02; G01K 1/08; G01K 17/06; G01K 13/00; G01K 1/14
USPC ............. 374/208, 163, 179, 185, 100, 29, 30, 374/137, 110, 112, 15, 166; 73/866.5
See application file for complete search history.

(56) References Cited

U.S. PATENT DOCUMENTS

| | | | | |
|---|---|---|---|---|
| 3,180,956 A | * | 4/1965 | Lindberg, Jr. | 337/318 |
| 4,135,396 A | | 1/1979 | Stanke | |
| 4,401,967 A | * | 8/1983 | Miwa et al. | 338/34 |
| 4,778,538 A | * | 10/1988 | Lyman | 136/230 |
| 4,901,061 A | * | 2/1990 | Twerdochlib | 340/604 |
| 6,130,598 A | * | 10/2000 | Katsuki et al. | 338/28 |
| 7,363,695 B2 | * | 4/2008 | Chu | 29/595 |
| 2003/0123517 A1 | * | 7/2003 | Nojiri | 374/120 |
| 2005/0175067 A1 | * | 8/2005 | Chu | 374/208 |

(Continued)

FOREIGN PATENT DOCUMENTS

| CH | 647 867 A5 | 2/1985 |
|---|---|---|
| CH | 647867 A5 | 2/1985 |

(Continued)

*Primary Examiner* — Gail Kaplan Verbitsky
(74) *Attorney, Agent, or Firm* — Bacon & Thomas, PLLC

(57) ABSTRACT

A thermal flow measuring device and method for the manufacture of a thermal flow measuring device with a housing, which has at least one shell. A temperature sensor element is arranged in the shell which borders the housing. Each first point of an edge terminating the outside of the shell in the region of a second end section of the shell has a distance to the longitudinal axis of the shell, which is at least 0.2 mm greater than the distance of all second points of the outside of the shell to the longitudinal axis of the shell, with a first point of the edge, in each case, having a distance projected on the longitudinal axis of the shell from the first point of the edge of at least 0.2 mm in the direction of the first end section of the shell.

9 Claims, 1 Drawing Sheet

(56) References Cited

U.S. PATENT DOCUMENTS

| | | | |
|---|---|---|---|
| 2005/0223828 A1 | 10/2005 | Olin | |
| 2007/0258506 A1* | 11/2007 | Schwagerman et al. | 374/179 |
| 2009/0041081 A1* | 2/2009 | Warth et al. | 374/143 |
| 2011/0051777 A1* | 3/2011 | Schlipf | 374/179 |
| 2012/0039362 A1* | 2/2012 | Pedersen et al. | 374/208 |
| 2012/0057617 A1* | 3/2012 | Bohl et al. | 374/208 |

FOREIGN PATENT DOCUMENTS

| | | |
|---|---|---|
| DE | 35 810 | 1/1965 |
| DE | 3338610 A1 | 5/1984 |
| DE | 94 20 768.2 | 6/1995 |
| DE | 9420768.2 | 6/1995 |
| DE | 10 2005 000 209 A1 | 7/2006 |
| DE | 10 2007 010 912 A1 | 9/2008 |
| EP | 1 965185 A2 | 9/2008 |
| JP | 01316669 A * | 12/1989 |

* cited by examiner

HOUSING OF A TEMPERATURE SENSOR, ESPECIALLY OF A THERMAL FLOW MEASURING DEVICE

TECHNICAL FIELD

The present invention relates to a housing of a temperature sensor, especially of a thermal flow measuring device, wherein the housing includes at least one shell with a first end section, a second end section and a longitudinal axis, which extends between the first and second end sections, wherein the shell has an outside, which borders the housing toward the environment and wherein a temperature sensor element, especially a resistance thermometer, is arranged in the region of the first end section of the shell.

BACKGROUND DISCUSSION

Known from the state of the art are temperature sensors for industrial process technology. Their construction is similar to that of thermal, flow measuring devices, with the difference that conventional thermal, flow measuring devices usually use two temperature sensors, which are embodied as equally as possible and arranged in, most often, pin-shaped, metal sleeves, so-called stingers or prongs, and which are in thermal contact with the medium flowing through a measuring tube or through a pipeline. Most often, they are immersed in the medium. For industrial application, the two temperature sensors are usually installed in a measuring tube; the temperature sensors can, however, also be directly mounted in the pipeline. One of the two temperature sensors is a so-called active temperature sensor, which is heated by means of a heating unit. Provided as a heating unit is either a separate resistance heater or the temperature sensor itself is a resistance element, e.g. an RTD (Resistance Temperature Device) sensor, which is heated by $I_2R$ heating, e.g. by a corresponding variation of the measuring current. The second temperature sensor is a so-called passive temperature sensor and measures the temperature of the medium at as small as possible self-warming by the measurement current.

Until now, mainly RTD-elements with helically wound, platinum wires have been applied in thermal, flow measuring devices. In the case of thin film, resistance thermometers (TF-RTDs), conventionally, a meander-shaped platinum layer is vapor deposited on a substrate. In addition, a glass layer is applied for protection of the platinum layer. The cross section of the thin film, resistance thermometer is rectangular, in contrast with the round cross section of RTD-elements. Heat transfer into the resistance element and/or from the resistance element occurs accordingly via two oppositely lying surfaces, which together make up a large part of the total surface of a thin film, resistance thermometer.

SUMMARY OF THE INVENTION

An object of the invention is to provide a housing for a temperature sensor, especially one of industrial, process measurements technology, wherein the housing is easy to manufacture.

The object is achieved by the housing of the invention for a temperature sensor, especially for a thermal flow measuring device, which includes at least one shell with a first end section, a second end section and a longitudinal axis, which extends between the first and second end sections. The shell includes an outside, which borders the housing toward the environment. Arranged in the shell in the region of the first end section is a temperature sensor element, especially a resistance thermometer.

The shell includes in the region of the second end section an edge terminating the outside of the shell. The points of the edge have, in each case, a distance to the longitudinal axis of the shell, which is greater than the distance of all other points of the outside of the shell to the longitudinal axis of the shell lying in a shared plane with the longitudinal axis of the shell and with the respective point of the edge. Moreover, the said distance of a point of the edge, in the following referred to as first point, is so dimensioned that the shell is weldable at the edge to a sensor holder by means of laser welding for creating a material bond. Besides the distance of the first point of the edge to the remaining outside of the shell, also the length of the shell is significant. The laser beam for welding must be guided past the shell during manufacture. The dimensions of the shell are correspondingly dependent on the angle of divergence of the laser beam.

Especially, the said distance of a first point of the edge is at least 0.2 mm greater than the distance of any other, second point of the outside of the shell to the longitudinal axis of the shell, which second point lies in an imaginary plane shared with the longitudinal axis of the shell and with the first point of the edge and which second point, in each case, has a distance projected on the longitudinal axis of the shell from the first point of the edge of at least 0.2 mm in the direction of the first end section of the shell. Especially, each first point of the edge terminating the outside of the shell has, in the region of the second end section of the shell, a distance to the longitudinal axis of the shell, which is at least 1.5 mm greater than the distance of all second points of the outside of the shell to the longitudinal axis of the shell, which lie in a plane shared with the longitudinal axis of the shell and with the first point of the edge and which, in each case, have a distance projected on the longitudinal axis of the shell from the first point of the edge of at least 1.5 mm in the direction of the first end section of the shell.

In order to satisfy hygienic specifications, the said distance of a first point of the edge is at least 3 mm greater than the distance of any other, second point of the outside of the shell to the longitudinal axis of the shell, which second point lies in an imaginary plane shared with the longitudinal axis of the shell and with the first point of the edge and which second point, in each case, has a distance projected on the longitudinal axis of the shell from the first point of the edge of at least 3 mm in the direction of the first end section of the shell.

In a further development of the invention, the function of the distance between the points of the outside of the shell, which lie between a first point of the edge and a second point of the outside of the shell, starting from the second point of the outside of the shell (which second point lies in a plane shared with the longitudinal axis of the shell and with the first point of the edge and which second point has a distance projected on the longitudinal axis of the shell from the first point of the edge of at least 0.2 mm in the direction of the first end section of the shell) and proceeding to the edge in the region of the second end section of the shell terminating the outside of the shell, is monotonically increasing, especially strongly monotonically increasing. In an example of an embodiment, this function is, moreover, continuous.

In a further development of the invention, the function of the distance between the points of the outside of the shell, which lie between a first point of the edge and a second point of the outside of the shell, starting from the second point of the outside of the shell (which second point lies in a plane shared with the longitudinal axis of the shell and with the first point of the edge and which second point has a distance projected on the longitudinal axis of the shell from the first point of the edge of at least 1.5 mm, especially at least 3 mm, in the direction of the first end section of the shell), has a derivative in the first point of the edge of the shell having a slope greater than or equal to one. In an example of an embodiment, the slope goes to infinity.

If the outside is considered as a graph of the function of the distance between the points of the outside of the shell and the longitudinal axis of the shell, the edge can represent a discontinuity, where the function is not differentiable. Nevertheless, the function then has a so-called left-, and, respectively, right-side derivative at each point of the edge. The left tangent, or the right tangent, at each point of the edge then has, in a further development, an angle with the longitudinal axis of the shell of at least 45°. Especially, this angle is greater than 60°. In an example of an embodiment, this angle amounts to 90°, i.e. the slope of the derivative goes to infinity.

In a further development of the invention, the outside of the shell has in the region of the second end section up to the edge terminating the outside of the shell a radius of curvature of at least 2 mm, especially at least 5 mm. The shell thus has a flare, which is especially embodied to be round. In order to fulfill the requirements for use in hygienic processes, the flare must have a greatest possible radius of curvature, for example, even greater than 6.5 mm.

In a further development of the invention, the shell has from the first end section to the second end section an essentially symmetric, especially rotationally symmetric, cross section about the longitudinal axis of the shell. The shell is, for example, stylus shaped, with an approximately circularly round cross section. Alternatively, the shell can also have an oval cross section.

In a further development of the invention, the shell is connected, especially connected by material bonding, at the edge terminating the outside of the shell, with an additional housing part, especially a sensor holder; especially, the shell is welded, especially by means of a laser welding method, to the sensor holder. The edge of the flare of the shell must at least so project sufficiently far that later welding of the annular seam between shell and sensor holder can still occur with a laser beam of defined beam diameter, e.g. 1 mm, perpendicularly from above.

In a further development of the invention, the function of the distance of at least one section of a shared section edge of the outside of the shell and an outside of the sensor holder, which outside of the sensor holder borders the housing toward the environment, which section edge lies in a shared sectional plane with the longitudinal axis of the shell, to the longitudinal axis of the shell, which section extends at least over, respectively, a subsection of the shell and a subsection of the sensor holder, is monotonic, wherein the length of each subsection amounts to at least 0.5 mm, especially at least 2.5 mm, especially at least 5 mm. In an example of an embodiment of the invention, the said function is, starting from the first end section of the shell, strongly monotonically increasing.

The joint, thus especially the weld seam, between sensor holder and shell is smooth and the surface seam-free, for example, the weld seam is polished, especially electropolished.

In a further development of the invention, the shell is sealed, in the region of the second end section, with a floor, which is especially perpendicular to the longitudinal axis of the shell. On the floor can then be arranged the temperature sensor, especially a resistance thermometer. Especially, the temperature sensor, especially the resistance-thermometer, is directly or indirectly connected with the floor. The floor can also be a floor of a pot-shaped cap or the floor of a stopper, or plug, introduced into the shell. Known are, additionally, spacers between shell and temperature sensor, which are inserted into the shell.

If the housing is used for a thermal flow measuring device having two temperature sensors, the first temperature sensor has a first housing of the invention and the second temperature sensor a second housing of the invention, wherein a first shell of the first housing and a second shell of the second housing are secured to a shared sensor holder. In an embodiment, the first shell has a shape and/or size, which is different from a shape and/or size of the second shell, for example, their cross sectional areas differ.

A thermal flow measuring device of the invention is produced by connecting the shell with the sensor holder by means of material bonding by a laser welding method. Then, the weld seam is polished, especially electropolished, on the outside of the housing.

The shell is welded with a sensor holder by means of laser welding, wherein the shell with the edge terminating the outside of the shell is so produced in the region of the second end section of the shell that the edge has a distance to the remaining outside of the shell, which is so dimensioned that the shell is weldable at the edge to the sensor holder by means of laser welding. Especially, the shell has a predetermined length, which is likewise so dimensioned that the shell is weldable to the sensor holder at the edge by means of the laser.

BRIEF DESCRIPTION OF THE DRAWING

The invention permits numerous forms of embodiment. Some of these will now be explained briefly here in greater detail based on the appended drawing, the sole FIGURE of which shows as follows.

DETAILED DISCUSSION IN CONJUNCTION WITH THE DRAWING

Figure 1:
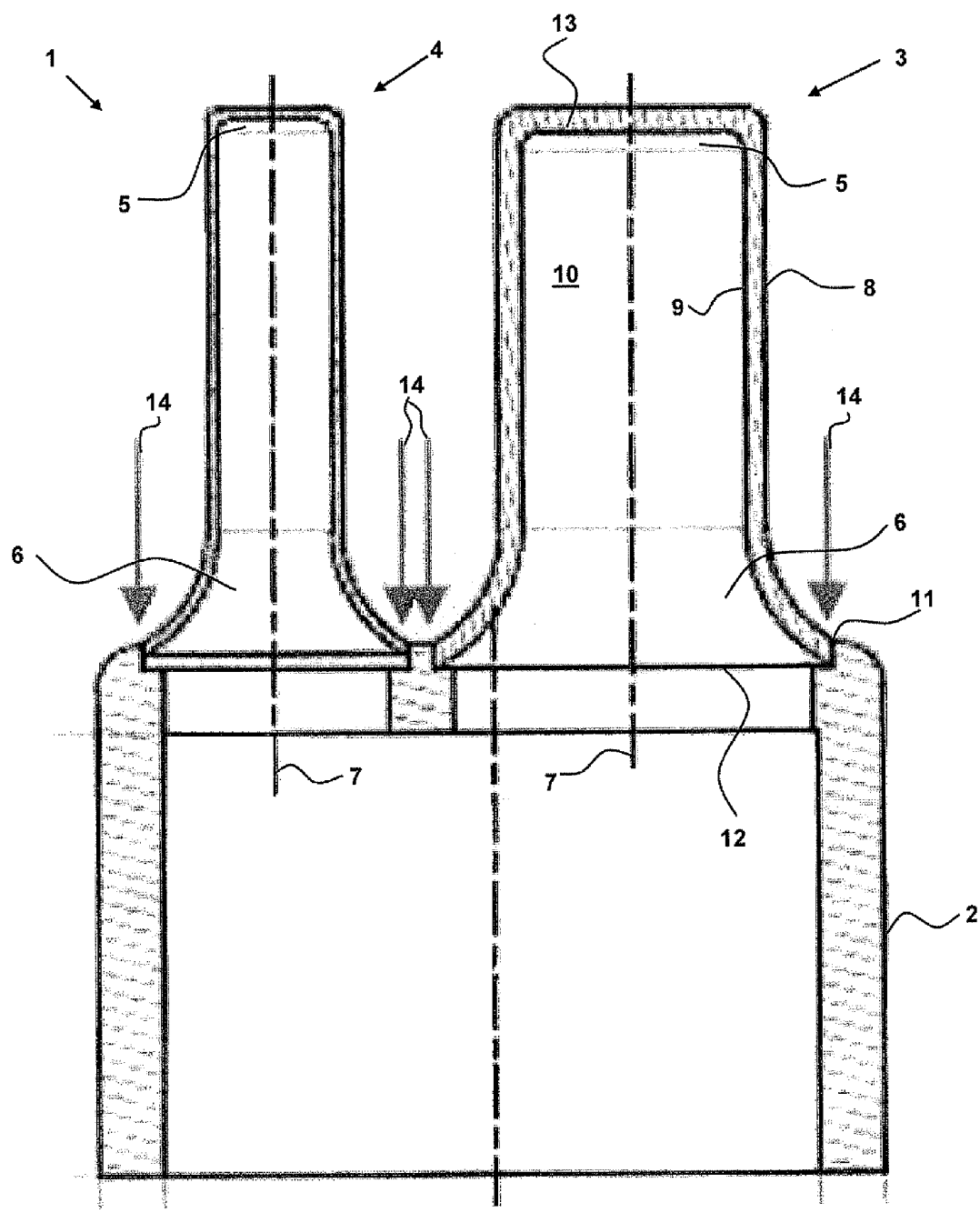
FIG. 1 in longitudinal section, a housing of the invention for a thermal flow device.

FIG. 1 shows in longitudinal section a housing 1 of the invention for a thermal flow device. The housing includes a sensor holder 2 and two shells 3 and 4 secured to the holder. Each of the two shells 3 and 4 has a first end section 5, a second end section 6 and a longitudinal axis 7, wherein the longitudinal axis extends between the first and second end sections. Not shown here is that each of the shells 3 and 4 has arranged in the region of the respective first end sections 5 a temperature sensor element, for example, a thin film, resistance thermometer. In the following, only the first shell 3 will be described in detail, since the shells 3 and 4 have all of the same features of the invention, except for their different dimensions, especially their different wall thicknesses and their differently large, cross sectional areas. The two shells 3 and 4 are essentially circularly shaped and therewith have rotationally symmetric cross sections about their respective longitudinal axes 7.

The first shell 3 has an outside surface 8, which borders the housing toward the environment. Besides the outside 8, the shell 3 has, of course, also an inside surface 9, which bounds the inner space 10 of the shell 3. Arranged in the inner space 10 are the temperature sensors, which are protected by the shell 3. Shell 3 has a predetermined wall thickness between inside 9 and outside 8. The outside 8 of the shell 3 is terminated in the region of the second end section 6 by an edge 11. Also the inside 9 of the shell 3 is terminated in the region of the second end section 6 by an edge 12. The two edges 11 and 12 are separated from one another by the wall thickness of the shell 3. The wall thickness of the shell 3 between the edges 11 and 12 provides an annular area, which, in this example of an embodiment, is in direct contact with the sensor holder 2. The annular area is the lateral surface of a cylinder with a longitudinal axis coaxial with the longitudinal axis 7 of the shell 3. This annular area can in other embodiments of the invention be, for example, the lateral surface of a cone, or it can even disappear, when the wall thickness between the edges 11 and 12 goes to zero and the edges 11 and 12 coincide. Edge 12 bounds here not only the inner space of the shell 3 but also simultaneously forms a second end of the shell 3. The first end here is formed by the floor 13 of the shell 3 in the region of the first end section 5.

Shell 3 is connected with the sensor holder 2 by material bond at least at its edge 11. Here, it is welded with the sensor holder over its entire wall thickness from the edge 11 to the edge 12. In this regard, each point of the edge 11 terminating on the outside surface 8 of the shell 3 in the region of the second end section 6 of the shell 3 has a distance to the longitudinal axis 7 of the shell 3, which is greater by at least 0.2 mm than the distance of all other points of the outside 8 of the shell 3 to the longitudinal axis 7 of the shell 3, which lie in an imaginary plane, here the plane of the drawing, shared with the longitudinal axis 7 of the shell 3 and with the corresponding point of the edge 11 and which, in each case, have a distance projected on the longitudinal axis 7 of the shell 3 to the corresponding point of the edge 11 of at least 0.2 mm in the direction of the first end section 5 of the shell 3. The outside 8 of the shell 3 has here in the region of the second end section 6 a radius of curvature of 6.5 mm in the plane of the drawing. The means, also, that each longitudinal section of the outside 8 in the region of the second end section 6, especially between the edge 11 and the points of the outside of the shell with a distance from the edge 11 projected on the longitudinal axis 7 of the shell 3 of, at most, 0.2 mm in the direction of the first end section 5 of the shell 3, is concave. In order to fulfill this condition, however, no classic radius must be present.

If the distance of the points of the outside 8 of the shown longitudinal section of the shell 3 to the longitudinal axis 7 of the shell 3 is described in the form of a mathematical function, then this function in this example is not differentiable at the position of the edge 11. There is, however, a right, and, respectively, a left tangent at the position of the edge 11. This tangent, derived approaching from the first end section 5, and here arbitrarily referred to as the right tangent, forms an angle of greater than 60° with the longitudinal axis 7 of the shell 3. This angle lies, according to the invention, between 45° and 90°. Correspondingly, the left tangent here extends parallel to the longitudinal axis 7 of the shell 3.

Furthermore, the just described function of the distance of the points of the outside 8 of the shell 3 to the longitudinal axis 7 of the shell 3 from the first end section 5 up to edge 11 is monotonic, here monotonically increasing, and in the region of the second end section 6, and, especially between the edge 11 and the points of the outside of the shell with a distance to the edge 11 projected on the longitudinal axis 7 of the shell 3 of, at most, 0.2 mm, strongly monotonically increasing away from the first end section 5 of the shell 3. The outside 8 of the shell 3 has therewith, at the edge 11, the largest cross section perpendicular to the longitudinal axis 7 of the shell 3. The same can hold true for the inside 9. Here, indeed, the cross sectional areas bounded by the edges 11 and 12 of the in- and outsides 9 and 8 of the shell 3 are equal in form and size; these can in other examples of embodiments, however, differ from one another.

On the basis of this special manner of construction, an option is to weld the shell 3 to the sensor holder 2 by means of a laser welding method. The arrows 14 represent the laser beams. The energy input into the material of the shell 3 and the material of the sensor holder 2 surrounding the weld seam is largest, when the laser beams impinge with an angle as near as possible to, or equal to, 90° onto the relevant surfaces. This is here the case for laser beams extending parallel to the longitudinal axes of the shells 3 and 4. This orientation provides the additional advantage that, in the case of two or more shells 3 and 4 arranged close to one another, no one shell interferes with the securement of another, and, respectively, that the laser beam does not need to undergo complicated adjusting. In order to be able to perform this axial laser welding, the points of the edge 11 of the outside 8 of the shell 3 have the greatest distance from the longitudinal axis 7 of the shell 3 and the other, above described properties.

For manufacturing, first the shells 3 and 4 and the sensor holder 2 are produced. Shells 3 and 4 are then inserted into the corresponding bores in the sensor holder 2 and there oriented on the sensor holder 2 by means of their annular surfaces formed by the wall thickness between the edges 11 and 12. Then, the shells are connected by material bonding on these surfaces, or only at the edge 11, with the sensor holder. In order that hygienic specifications of industrial process technology can be met, the welded seams are again mechanically processed after the welding. They are polished, especially electropolished. In this way, a smooth surface is achieved. This is a further advantage of the invention, since this subsequent mechanical working is very easy and cost effective to perform. A "seam free" surface is obtained. The function of the distance to the longitudinal axis 7 of the shell 3 of at least one subsection of the outside 8 of the shell 3 and a subsection of the outside of the sensor holder, which lie with the longitudinal axis 7 of the shell 3 in a shared sectional plane and which together form a continuous section of the function, is monotonic, wherein the length of each subsection amounts to at least 0.5 mm.

The invention claimed is:

1. A housing of a temperature sensor, comprising:
at least one shell with a first end section, a second end section and a longitudinal axis, wherein:
the longitudinal axis extends between said first and said second end sections;
a temperature sensor element is arranged in the shell in the region of said first end section;
said at least one shell has an outside, which borders the housing toward the environment, characterized in that each first point of an edge terminating the outside of said at least one shell in the region of said second end section of the shell has a distance to the longitudinal axis of said at least one shell, which is at least 0.2 mm greater than the distance of all second points of the outside of said at least one shell to the longitudinal axis of said at least one shell, which lie in a plane shared with the longitudinal axis of said at least one shell and with the first point of the edge and which, in each case, have a distance projected on the longitudinal axis of said at least one shell from the first point of the edge of at least 0.2 mm in the direction of said first end section of said at least one shell.

2. The housing of a temperature sensor as claimed in claim 1, wherein:

each longitudinal section of the outside of said at least one shell lying in a plane with the longitudinal axis of said at least one shell is concave in the region of said second end section.

3. The housing of a temperature sensor as claimed in claim 1, wherein:
the outside of said at least one shell in the region of said second end section up to the edge terminating the outside of said at least one shell has a radius of curvature of at least 2 mm.

4. The housing of a temperature sensor as claimed in claim 1, wherein:
said at least one shell has an essentially rotationally symmetric cross section about the longitudinal axis of said at least one shell.

5. The housing of a temperature sensor as claimed in claim 1, wherein:
said at least one shell is connected with a sensor holder by material bonding at the edge terminating on the outside of said at least one shell.

6. The housing of a temperature sensor as claimed in claim 1, wherein:
the function of the distance to the longitudinal axis of said at least one shell of at least one section of a shared section edge of the outside of said at least one shell and an outside of the sensor holder in a sectional plane shared with the longitudinal axis of said at least one shell, which at least one section extends at least over, respectively, a subsection of said at least one shell and a subsection of the sensor holder, is monotonic, wherein the length of each subsection amounts to at least 0.5 mm.

7. A temperature sensor with a housing as claimed in claim 1, wherein:
said at least one shell is sealed on the second end section with a floor, with which the temperature sensor is connected.

8. A thermal flow measuring device, which has a first temperature sensor and at least a second temperature sensor, wherein the first temperature sensor and said second temperature sensor have a first and second housing, respectively in claim 1; and
a first shell and a second shell are secured on a sensor holder.

9. The thermal flow measuring device as claimed in claim 8, wherein:
the first shell has a shape and/or size, which is different from a shape and/or size of the second shell.

* * * * *